United States Patent [19]

Torr et al.

[11] 4,113,979
[45] Sep. 12, 1978

[54] SPACING DEVICES FOR OVERHEAD TRANSMISSION LINES

[75] Inventors: Ralph Percival Torr, New Malden; Miles Albert Beauchamp, Crawley, both of England

[73] Assignee: Andre Rubber Company Limited, England

[21] Appl. No.: 765,274

[22] Filed: Feb. 3, 1977

[30] Foreign Application Priority Data

Feb. 6, 1976 [GB] United Kingdom ................ 4746/76

[51] Int. Cl.² .................. H02G 7/14; H02G 7/12
[52] U.S. Cl. .................... 174/42; 174/146; 403/130; 403/132; 403/133; 403/225
[58] Field of Search ............... 174/40 R, 42, 128 BL, 174/146; 403/130, 132, 133, 134, 135, 140, 141, 142, 143, 225, 226, 228

[56] References Cited

U.S. PATENT DOCUMENTS

| | | | |
|---|---|---|---|
| 3,157,731 | 11/1964 | Torr | 174/146 X |
| 3,711,623 | 1/1973 | Schiavone | 174/146 X |

FOREIGN PATENT DOCUMENTS 497,624  12/1938  United Kingdom .................... 403/133

*Primary Examiner*—Laramie E. Askin
*Attorney, Agent, or Firm*—Staas & Halsey

[57] ABSTRACT

A device for spacing individual conductors of an overhead transmission line having a hub provided with at least two cavities each opening onto the periphery of the hub, at least two arms each having a conductor clamp at one end and a knob at the other end, the knob being received with clearance within a cavity to permit limited articulation of each arm with respect to the hub, and an elastomeric bush mechanism substantially encircling the arm in the clearance gap between the knob and the cavity wall, the cross-section of each half of the bush on opposing sides of a maximum diameter portion of the knob having been deformed by compression during assembly of the device such that the edge or side portions of the deformed cross-sections include elastomeric material displaced from the central portions of the uncompressed cross-sections.

13 Claims, 4 Drawing Figures

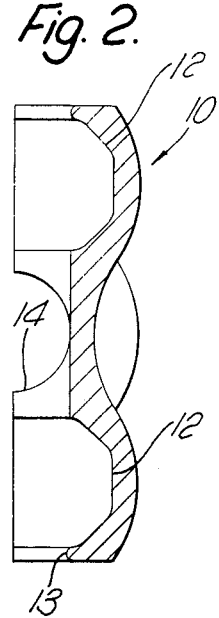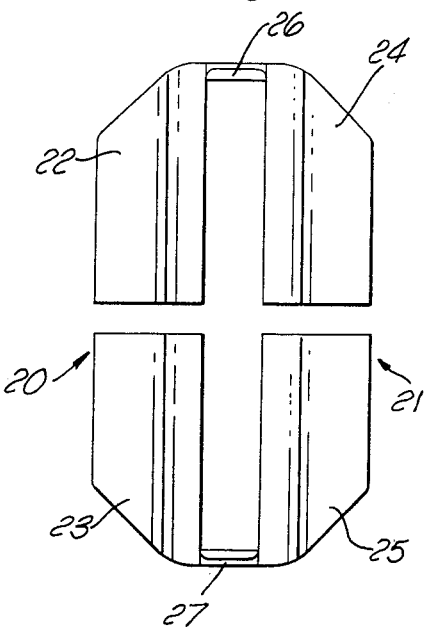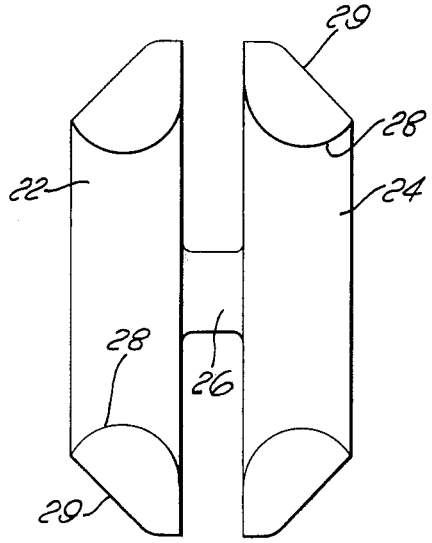

SPACING DEVICES FOR OVERHEAD TRANSMISSION LINES

BACKGROUND AND SUMMARY OF THE INVENTION

This invention relates to spacing devices for spacing the individual conductors of one phase or pole of an overhead electrical power transmission line, the device also serving to damp the relative movements of the conductors. For this reason, the devices are often referred to as spacer-dampers.

Our British Pat. No. 966,243, corresponding to U.S. Pat. 3,157,731, discloses a spacer-damper that has proved very effective and is in widespread use. It consists essentially of a hub having at least two cavities each opening onto the hub periphery, and at least two arms each having a conductor clamp at one end and a knob at the other end, the knob being received with clearance within a respective cavity to permit limited articulation of each arm with respect to the hub. An elastomeric bush encircles each arm in the gap between the knob and the cavity wall so that oscillations of the conductors are damped by straining the elastomeric material, the kinetic energy being dissipated as heat. In general, the greater the amplitude of the conductor oscillations, the greater will be the deflection of the elastomer and the greater will be the energy dissipated per cycle. Thus to accommodate as large an amplitude of conductor movement as possible (without the conductors actually touching one another), the bush should generally be as fat as possible, consistent with a good fatigue life. Also in general the lower the stiffness of the spacer, the larger will be the permitted amplitude of conductor movement.

However, merely fattening the bush disclosed in our aforesaid U.S. Pat. No. 966,243 in order to accommodate bigger deflections of the elastomeric material will lead to a reduction in fatigue life of the spacer. This is because there will be an increased chance of slippage occurring at the contact face between the knob and the bush when the arm is displaced from its neutral position. Because the bush is compressed between the knob and the cavity wall during assembly of the spacer, any slippage as a result of large conductor movements, will cause wear and chafing of the elastomer. This could eventually lend to loss of the pre-compression and thereby reduce the effectiveness of the bush. The pre-compression is intended to prevent slippage but, since the elastomer is generally a constant volume material, any attempt to increase this pre-compression for a given clearance gap by increasing the fatness of the bush before compression will only result in the excess elastomer being squeezed out of the gap.

In accordance with the present invention this problem is overcome by shaping the cross-section of each half of the uncompressed bush located on opposing sides of the maximum diameter portion of the knob such that the cross-section of each half bush is deformed during compression to displace elastomeric material laterally in both directions away from the centre of each half bush whereby the compressed halves of the bush each have a greater degree of pre-compression at the centre of their cross-section than at the ends of their cross-section. Each half bush may be split into two semi-circular bushes which together encircle the arm, and the two pairs of half bushes on opposite sides of the maximum diameter portion of the knob are then preferably interconnected, for example by a small integral elastomeric tab. This facilitates assembly of the spacer since it avoids having four separate half bushes.

Each bush is compressed in the gap between the knob and the cavity wall during assembly of the device. Before compression each half bush preferably has a cross-section which over its centre portion is considerably thicker than the pertinent gap dimension and which over its two side portions is thinner than the pertinent gap dimension. Thus, when the half bush is compressed in the relevant gap, the elastomeric material is displaced both ways from the centre portion and accommodated at the side portions. In a preferred form the gap is a parallel-sided gap in cross-section and each uncompressed half bush is generally semi-circular in cross-section with the exposed diameter abutting one side of the gap. When compressed, the generally semi-circular cross-section shape deforms to a generally rectangular shape with rounded corners.

BRIEF DESCRIPTION OF THE DRAWINGS

An embodiment of the invention will now be described, by way of example with reference to the accompanying drawings in which;

FIG. 2 is a section on line 2—2 of one half of a hub of the FIG. 1 device;

FIG. 3 is a general view of the bushes prior to insertion in the FIG. 1 device; and FIG. 4 is an end view of a linked pair of half bushes prior to compression.

DESCRIPTION OF THE PREFERRED EMBODIMENT

Figure 1:
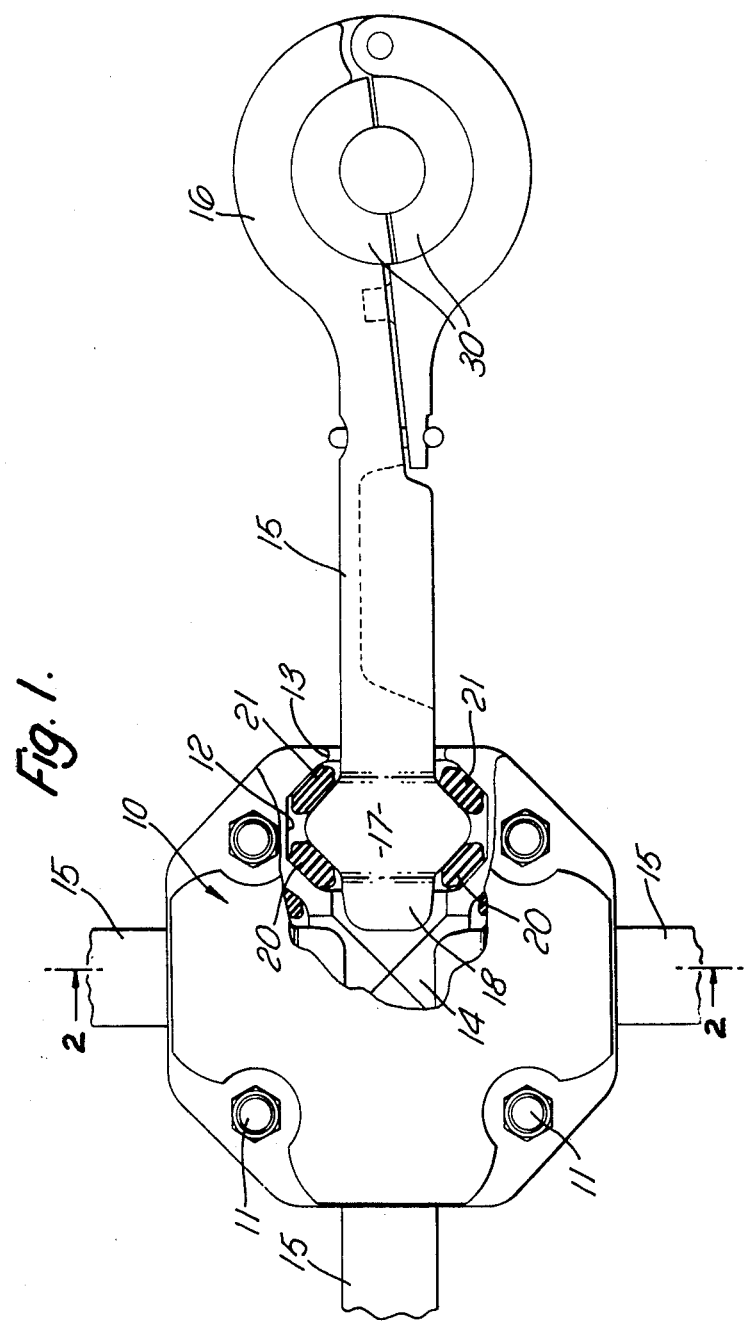
FIG. 1 is an elevation of a spacer-damper according to the invention, with parts broken away and parts in sections.

The drawings show a spacer-damper device comprising a hub 10 formed in two similar halves bolted together by bolts 11. FIG. 2 shows a section through one hub half on line 2—2 of FIG. 1. The assembled hub provides four cavities 12 which open at mouths 13 on the hub periphery and also interconnect by a cross-bore 14 centrally within the hub. Four similar clamp arms 15 are provided each having a conductor clamp 16 at one end and being formed with a knob 17 at the other end received with clearance within a respective cavity 12. The jaws of the clamp 16 receive elastomeric bushes 30 encircling the conductor and are suitably as described in our British Pat. Specifications Nos. 929,693 and 966,243, respectively corresponding to U.S. Pat. Nos. 3,161,721 and 3,157,731. The invention is applicable to spacer devices with two or more arms.

Each arm 15 also extends inwardly of the knob 17 into the cross-bore 14 as shown at 18. Each knob 17 and cavity wall 12 is circular in all cross-sections taken perpendicular to the longitudinal axis of the arm and thus the arm can articulate to a limited extent in all directions. It may also move slightly longitudinally and transversely. According to a feature of the invention the articulation limit is set by the arm outwardly of the knob contacting the cavity mouth 13 substantially simultaneously with the arm extension 18 contacting the wall of the cross-bore 14, a suitable limit being in the range of 5° to 20° of angular movement each side of the equilibrium position shown in FIG. 1 with a preferred value of about 12°.

First and second elastomeric bush means 20 and 21 are spaced apart longitudinally of the arm and substantially encircle each arm under compression between the knob 17 and the wall of the cavity 12. Bush means 20 and 21 are each in the form of a pair of substantially semi-circular half bushes 22, 23 and 24, 25 respectively, and to avoid having four separate loose half bushes to handle and assemble, corresponding half bushes in each pair are manufactured linked together by a small easily broken integral elastomeric tab. As shown in FIG. 3, half bushes 22, 24 are linked by a tab 26, and half bushes 23, 25 are linked by a tab 27. FIG. 3 shows the half bushes prior to assembly, but in their correct relative positions.

FIG. 4 is an end view of one of the linked pair of half bushes 22, 24 and tab 26, and shows the bushes in their uncompressed state before being introduced into the hub cavity. The cross-section of each half bush is uniform along its length, and is generally semi-circular with the exposed diameter, e.g. 29, lying radially outwardly so that the semi-circular face 28 bulges radially inwardly.

A clearance gap between the knob and the cavity wall is uniform around the knob and, as seen in FIG. 1, has generally parallel bounding surfaces in cross-section. The centre portion of the semi-circular cross-section of each half bush is considerably thicker than the dimension across the gap, and over the side portions is thinner than the gap dimension. Thus when the pairs of half bushes co-operate to encircle the respective knobs, and the two hub halves are bolted together to trap the half bushes and knobs in their cavities, the half bushes become compressed as shown in FIG. 1. The bushes deform under compression so that the cross-section becomes generally rectangular with rounded ends. It will be appreciated that semi-circular cross-section bushes associated with parallel sided gaps give space for the elastomeric material in the centre portion of the cross-sections to move into upon compression.

The described shape of the half bushes permits a greater degree of confined compression at the centre of the cross-section and a lesser degree at the ends than can be obtained with conventional annular bushes of identical installed cross-section. Torsional deflection of the joint occurs when the conductor oscillates and imposes a combination of fluctuating shear and compression strain within the elastomer which tends to induce slip between the elastomer and the knob. The angle of torsion at which slip occurs is increased with the described shape by virtue of the increased pre-strain at the elastomer section centre and because of a rolling action which occurs at the free extremities. Consequently, a larger arm movement of the conductor with accompanying energy loss within the elastomer can be obtained without increasing the elastomer volume or reducing the fatigue life of the spacer. The shaped bush also leads to a reduction in torsional stiffness with respect to arm articulation which assists control of conductor oscillation.

In one particular form of spacer device embodying the present invention, only two diametrically opposed arms extend from the hub. Such a device is particularly useful when it is only necessary to damp vibrations of the conductors in a vertical plane. These vertical or Aeolin vibrations have a relatively low amplitude and high frequency when compared with vibrations in the horizontal plane, and they are best damped by placing the spacing device mid-way between two conductors with the arms substantially horizontal. Normally, however, when horizontal vibrations must also be taken into account, the two arms would be inclined to both the horizontal and vertical planes. The horizontal vibrations are generally caused by wind striking one of the conductors normal to the dirction of the conductors, and thereby producing a turbulent wake which can excite an adjacent conductor. It is sometimes possible to avoid this mode of vibration by spacing the conductors far enough apart and it is in this case that a device having only a single pair of diametrically opposed arms may be used to space the conductors apart in a horizontal plane. For a group of four conductors, a single hub having two diametrically opposed pairs of parallel arms may be used, the arms all being arranged horizontally in use.

What we claim is:

1. A spacing device for spacing individual conductors of an overhead transmission line, the device comprising a hub having at least two cavities therein each opening onto the hub periphery, at least two arms each having a conductor clamp at one end and being formed with a knob at or adjacent the other end, the knob being received with clearance within a respective cavity to permit limited articulation of each arm with respect to the hub; and elastomeric bush means substantially encircling the arm in the clearance gap between the knob and the cavity wall, each half of the bush means on opposing sides of a maximum diameter portion of the knob having an initial generally semicircular cross-sectional shape, deformed by compression between said knob and said cavity wall during assembly of the device such that the edges or side portions of the deformed cross-sections of said bush means include elastomeric material displaced laterally from the central portions during compression thereof.

2. A device according to claim 1 in which the bush means comprises first and second spaced apart elastomeric bushes, said first and second bushes each substantially encircling the arm on opposite sides of the maximum diameter portion of the knob.

3. A device according to claim 2 in which the first and second bushes each comprises a pair of substantially semi-circular bushes, and in which corresponding bushes in the respective pairs are inter-connected by an integral elastomeric tab.

4. A device according to claim 1 wherein each bush comprises an uncompressed cross-section which over a centre position is thicker than the relevant gap dimension between the knob and the cavity wall and over respective side portions is thinner than the relevant gap dimension.

5. A device according to claim 1 in which each arm extends inwardly of the cavity beyond the knob, and the arrangement being such that the arm is able to pivot about the knob through a predetermined angle between two extreme positions at each of which the arm extension is brought into contact with a rear wall of the cavity at substantially the same time as the arm contacts the mouth of the cavity at the hub periphery.

6. A device according to claim 5 in which the predetermined angle lies in the range of 10° – 40°.

7. A device according to claim 1 in which the hub includes two pairs of diametrically opposed cavities each having an associated arm and so arranged that adjacent arms are substantially perpendicular to one another.

8. A device according to claim 1 including only a single pair of the said cavities, the associated arms extending from the cavities being diametrically opposed to one another.

9. An assembly according to claim 8 in which each half of said bush means comprises a pair of semi-circular half bushes and each half bush has a substantially semi-circular cross-section.

10. A spacing device for spacing individual conductors of an overhead transmission line, the device comprising a hub having at least two cavities therein each opening onto the hub periphery, at least two arms each having a conductor clamp at one end and being formed with a knob at or adjacent the other end, the knob being received with clearance within a respective cavity to permit limited articulation of each arm with respect to the hub; and elastomeric bush means substantially encircling the arm in the clearance gap between the knob and the cavity wall, each half of the bush means on opposing sides of a maximum diameter portion of the knob having an initial generally semi-circular cross-section shape deformed by compression between said knob and said cavity wall during assembly of the device such that each half of said bush means has a greater degree of pre-compression at the centre of its cross-section than at the ends of its cross-section.

11. A device according to claim 10 in which the gap between the knob and the cavity wall is a generally parallel-sided gap in cross-section when the knob is symmetrically disposed within the cavity, and in which the cross-section of each half of said bush means is deformed from a generally semi-circular shape into a generally rectangular shape with rounded ends when compressed in the gap during assembly of the device.

12. A device according to claim 11 in which the hub is separable into two parts and in which the cross-section of the bush means is deformed in the gap when the two parts are secured together during assembly of the device.

13. An assembly of parts for producing a spacing device for spacing individual conductors of an overhead transmission line, the assembly comprising a hub having at least two cavities therein each opening onto the hub periphery, at least two arms each having a conductor clamp at one end and being formed with a knob at or adjacent the other end, the knob being receivable with clearance in a respective cavity to permit limited articulation of each arm with respect to the hub, and first and second elastomeric bushes for insertion between the knob and the cavity wall on opposite sides of a maximum diameter portion of the knob when the knob is received within the cavity, each of the bushes having a cross-section which is thicker at the centre than at either side, the thickness at the centre being greater than the relevant dimension of the clearance gap formed between the knob and the cavity wall, whereby elastomeric material is laterally displaced in both directions from the centre of each bush when the bushes are compressed in the gap during assembly of the device.

* * * * *